Patented Feb. 18, 1941

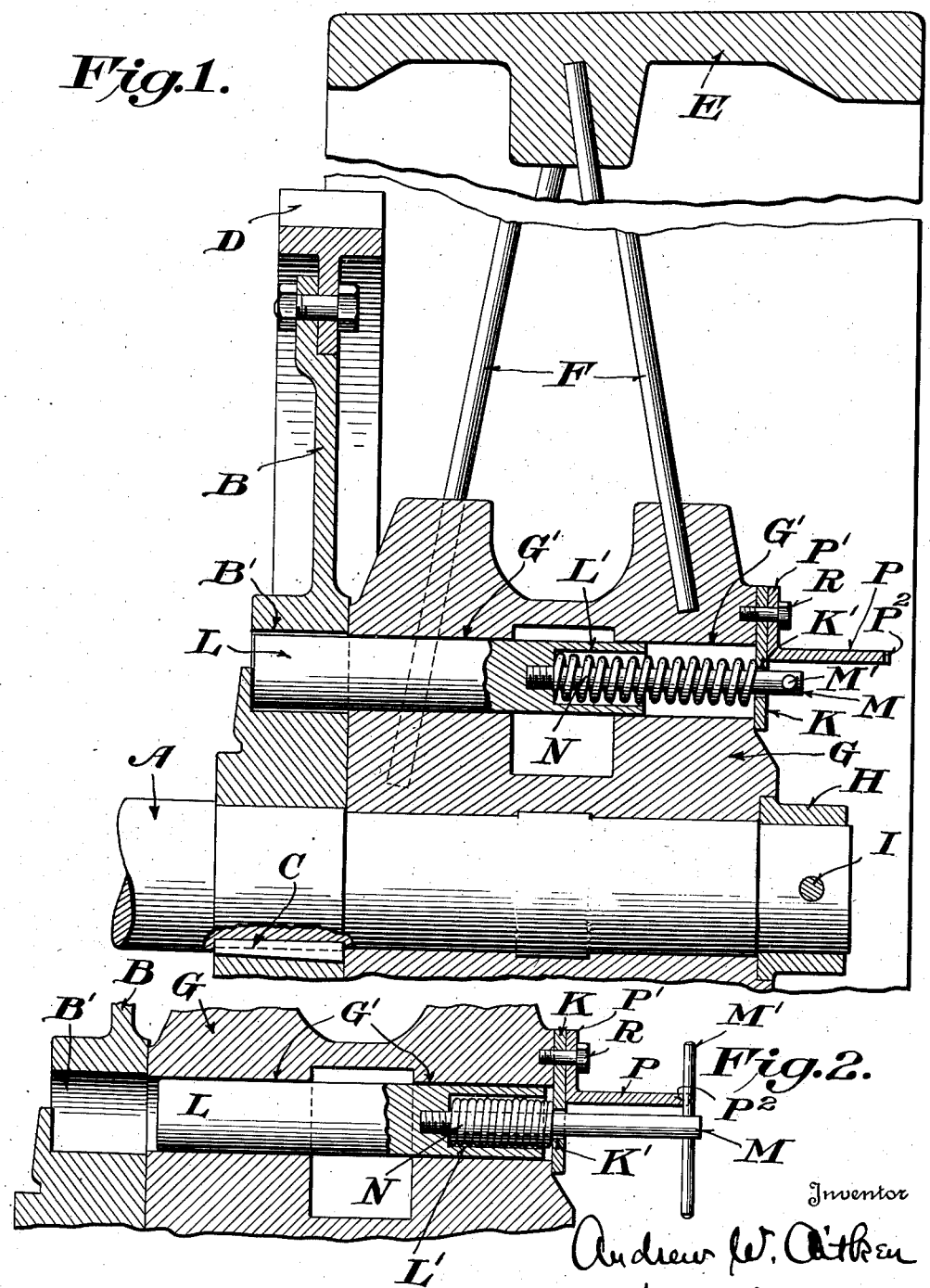

2,232,584

UNITED STATES PATENT OFFICE 2,232,584

DRIVE WHEEL LOCK

Andrew W. Aitken, Springfield, Ohio, assignor to The Buffalo-Springfield Roller Co., Springfield, Ohio, a corporation of Ohio Application July 22, 1940, Serial No. 346,865

9 Claims. (Cl. 192—25)

This invention is a novel improvement in drive wheel locks, particularly adapted for use on road rollers or the like of the three-wheel type which are not provided with differentials in their driving axles but have a solid rear axle rotatably mounted in bearings in the side frames of the vehicles to which power is transmitted from drive shafts disposed parallel with the rear axles, said drive shafts having pinions meshing with ring gears on driven disks fixedly mounted on the rear axles adjacent the ground wheels, which wheels are rotatably mounted on the ends of the axles and may freely revolve thereon, locking bolts being provided for individually connecting the ground wheels to their respective driven disks to cause same to rotate therewith, which bolts are retractable to permit their related ground wheels to rotate freely on the axles when rounding curves.

The principal object of my invention is to provide a novel means whereby one man may readily lock or unlock the ground wheels with respect to their related driven disks, said means comprising spring pressed bolts mounted in bores in the hubs of the ground wheels adapted to enter one of a series of holes in their related driven disks beside the wheels, said bolts having means for holding same retracted out of locking positions, said means when released permitting the springs to project the bolts into holes in the related driven disks when the holes and bolts are aligned due to relative rotation of the driven disks and wheels.

Other minor objects of the invention will be hereinafter set forth.

I will explain the invention with reference to the accompanying drawing which illustrates one practical embodiment thereof to enable others to adopt and use the same; and will summarize in the claims, the novel features of construction, and novel combinations of parts, for which protection is desired.

In said drawing:

Fig. 1 is a vertical section through a portion of a rear axle of a vehicle, showing the driven disk and ground wheel at one end thereof, the locking bolt being shown in position to lock the ground wheel to the driven disk.

Fig. 2 is a fragmentary sectional view showing the bolt retained in retracted or unlocking position.

The solid vehicle axle A may be mounted in any desired manner in the frame of the vehicle so as to rotate freely therein and to project beyond both sides of the vehicle. On said axle, adjacent each end thereof, is a driven disk B keyed to axle A by a key C or the like so that shaft A will rotate with disk B. At the outer end of disk B is a ring gear D secured thereto by bolts or the like, said ring gear D meshing with a drive pinion (not shown) on a drive shaft journaled in the vehicle frame parallel with axle A.

On the end of axle A is a ground wheel E having a rim portion connected by spokes F to a hub portion G loosely journaled upon axle A between the related driven disk B and a collar H on the axle fixed in place thereon by a pin I or the like. When the vehicle is moving in a straight-line direction it is usually desirable to have both ground wheels G locked to their respective driven disks B; but when rounding curves, since the axle A in such vehicles contains no differential, it is advisable that one ground wheel E constitute the drive wheel, while the wheel at the other side of the vehicle merely rotates loosely on axle A.

Heretofore it was necessary for the attendants, when locking a ground wheel to its driven disk, to walk beside the vehicle, one at each side thereof, and to push inwardly on the locking bolt carried by the ground wheel until the slippage or relative rotation of the ground wheel and driven disk would bring the bolt into alignment with one of a series of holes in the driven disk B. I have provided a novel spring pressed locking bolt in which the bolt being spring-actuated will permit one attendant to lock and unlock the wheels at both sides of the vehicle, whereas the old method of pushing and pulling the pin into place required two attendants, one at each side of the vehicle.

According to my invention, the hub G of wheel E is provided with a bore G' disposed parallel with but offset from axel A, said bore extending entirely through the hub at a point opposite the hub of disk B, which disk is provided with one or mole holes B' adapted to be brought into register with bore G' when the disk and wheel are in certain relative rotative positions.

At the outer end of bore G' is a plate K having a hole K' therein disposed axially of bore G'. Within bore G' is a bolt L of length slightly less than that of the bore G', said bolt L having an axial recess L' in its outer end of the diameter to receive a coiled spring N and to substantially house the spring N therein when the bolt is retracted into position adjacent plate K. An axially disposed rod M extends from the bottom of recess L', same preferably having a threaded engagement with the bolt, and rod M passes through hole K' in plate K. On rod M interposed between the bottom of recess L' and the plate K is a coiled spring N adapted to normally urge bolt L inwardly towards the driven disk B, so that said bolt will enter a bore B' in driven disk B when the bores B' and G' are in alignment as shown in Fig. 1.

On the outer face of plate K is an angle iron clip P having its base flange P' removably secured by screw R or the like to the plate K and the hub G. Clip P extends parallel with the rod M and the outer end of clip P is a notch P2 adapted to receive across-bar M' on the outer end of rod M when bolt L is retracted and the cross-bar given a quarter turn, to hold the bolt in retracted position shown in Fig. 2. The length of clip is such that when the cross-bar M' is engaged with the notch P2, the bolt L will be confined entirely within bore G' in the hub G.

The above construction provides a novel spring-actuated locking bolt which permits one man to lock and unlock the wheels at each side of the vehicle instead of requiring the use of two men using the former bolt pushing and pulling methods. When it is desired to lock a wheel G to axle A using my novel spring pressed bolt, the operator merely gives the cross-bar M' of rod M a quarter turn from the position shown in Fig. 2 to disengage same from notch P2, and the spring N yieldably urges the bolt L into contact with the hub of driving disk B so that relative rotation of shaft A and wheel E will bring a hole B' of the driven disk hub B into register with the bolt L, whereupon the spring N will automatically force the bolt into place in said hole. When the wheel is to be unlocked from shaft G, the operator may at any time pull the cross-bar M' outwardly to retract the bolt, and by giving the cross-bar a quarter turn the same may be engaged with the notch P2 of clip P so that the axle and wheel E may rotate independently.

I claim:

1. In combination, a driven disk having a hub; a wheel freely mounted beside the disk and having a hub; said wheel hub having a bore extending therethrough opposite the disk hub; the disk hub having one or more holes adapted to register with the bore as the disk and wheel are relatively rotated; a locking bolt in said bore; means yieldably urging the bolt towards the disk; means for holding the bolt retracted within the bore, said bore having a contracted portion at its outer end; a rod extending through said contracted portion and secured to the bolt; and said yieldable means comprising a contracted spring in the bore interposed between the contracted outer portion thereof and said bolt.

2. In combination, a driven disk having a hub; a wheel freely mounted beside the disk and having a hub; said wheel hub having a bore extending therethrough opposite the disk hub; the disk hub having one or more holes adapted to register with the bore as the disk and wheel are relatively rotated; a locking bolt in said bore; means yieldably urging the bolt towards the disk; means for holding the bolt retracted within the bore, the outer end of the bolt having an axial recess; a member constricting the outer end of the bore; said bolt when retracted substantially filling the bore; a rod extending through said member and secured to the bolt at the bottom of the recess; said yieldable means comprising a contracted spring around the rod interposed between the member and bottom of the recess; and said recess housing the spring when the bolt is retracted.

3. In combination, a driven disk having a hub; a wheel freely mounted beside the disk and having a hub; said wheel hub having a bore extending therethrough opposite the disk hub; the disk hub having one or more holes adapted to register with the bore as the disk and wheel are relatively rotated; a locking bolt in said bore; means yieldably urging the bolt towards the disk; means for holding the bolt retracted within the bore, said bolt extending out of said bore; and said holding means comprising a clip mounted on the ground wheel having a flange extending parallel with the bore provided with a notch; and a cross-bar on said bolt adapted in one position to engage the notch, the length of the flange being such that the bolt will be fully retracted within the bore when the cross-bar is engaged with the notch.

4. In combination, a driven disk having a hub; a wheel freely mounted beside the disk and having a hub; said wheel hub having a bore extending therethrough opposite the disk hub; the disk hub having one or more holes adapted to register with the bore as the disk and wheel are relatively rotated; a locking bolt in said bore; means yieldably urging the bolt towards the disk; means for holding the bolt retracted within the bore, a member restricting the outer end of the bore; a rod extending through said member and secured to the bolt; said yielding means comprising a contracted spring interposed between the member and bolt; and said holding means comprising a clip mounted on the ground wheel having a flange extending parallel with the bore provided with a notch; and a cross-bar on said rod adapted in one position to engage the notch, the length of the flange being such that the bolt will be fully retracted within the bore when the cross-bar is engaged with the flange.

5. In combination, a driven disk having a hub; a wheel freely mounted beside the disk and having a hub; said wheel hub having a bore extending therethrough opposite the disk hub; the disk hub having one or more holes adapted to register with the bore as the disk and wheel are relatively rotated; a locking bolt in said bore; means yieldably urging the bolt towards the disk; means for holding the bolt retracted within the bore, the outer end of the bolt having an axial recess; a member constricting the outer end of the bore; said bolt when retracted substantially filling the bore; a rod extending through said member and secured to the bolt at the bottom of the recess; said yieldable means comprising a retracted spring around the rod interposed between the member and bottom of the recess; and said recess housing the spring when the bolt is retracted; and said holding means comprising a clip mounted on the ground wheel having a flange extending parallel with the bore provided with a notch; and a cross-bar on said rod adapted in one position to engage the notch, the length of the flange being such that the bolt will be fully retracted within the bore when the cross-bar is engaged with the flange.

6. In combination, an axle; a driven disk fixedly mounted thereon and having a hub; a ground wheel freely mounted on said axle beside the disk and having a hub; said wheel hub having a bore extending therethrough opposite the disk hub; the disk hub having one or more holes adapted to register with the bore as the disk and wheel are relatively rotated; a locking bolt in said bore; means yieldably urging the bolt towards the disk; said bolt extending out of said bore and having a handle; and a member on said wheel adapted to be engaged by the handle to maintain the bolt retracted from the holes in the disk.

7. In a combination as set forth in claim 6, said bore having a contracted portion at its outer end; a rod extending through said contracted portion and secured to the bolt; and said yieldable means comprising a contracted spring in the bore interposed between the contracted outer portion thereof and said bolt.

8. In a combination as set forth in claim 6, the outer end of the bolt having an axial recess; a member constricting the outer end of the bore; said bolt when retracted substantially filling the bore; a rod extending through said member and secured to the bolt at the bottom of the recess; said yieldable means comprising a contracted spring around the rod interposed between the member and bottom of the recess; and said recess housing the spring when the bolt is retracted.

9. In a combination as set forth in claim 6, said handle comprising a cross-bar; and said member comprising a clip adjacent the extending portion of the bolt against which the cross-bar is adapted to contact when the bolt is retracted and partly rotated.

ANDREW W. AITKEN.